US010920127B2

(12) United States Patent
Wu et al.

(10) Patent No.: US 10,920,127 B2
(45) Date of Patent: Feb. 16, 2021

(54) METHOD FOR IN-DEPTH PROFILE CONTROL AND DISPLACEMENT OF LOW-PERMEABILITY OIL RESERVOIRS

(71) Applicant: PETROCHINA COMPANY LIMITED, Beijing (CN)

(72) Inventors: Tianjiang Wu, Beijing (CN); Mingke Zheng, Beijing (CN); Xianwen Li, Beijing (CN); Haien Yang, Beijing (CN); Xiaorong Li, Beijing (CN); Fan Tang, Beijing (CN); Fangfang Xue, Beijing (CN); Ronghuan Chen, Beijing (CN); Rong Zhang, Beijing (CN); Lijun Zheng, Beijing (CN); Chunmei Xu, Beijing (CN); Baoche Liu, Beijing (CN); Ping Yi, Beijing (CN); Jiajie Zhu, Beijing (CN); Weiyu Bi, Beijing (CN)

(73) Assignee: PETROCHINA COMPANY LIMITED, Beijing (CN)

(*) Notice: Subject to any disclaimer, the term of this patent is extended or adjusted under 35 U.S.C. 154(b) by 35 days.

(21) Appl. No.: 16/251,609

(22) Filed: Jan. 18, 2019

(65) Prior Publication Data
US 2019/0292438 A1 Sep. 26, 2019

Related U.S. Application Data

(63) Continuation of application No. PCT/CN2018/082670, filed on Apr. 11, 2018.

(30) Foreign Application Priority Data

Mar. 21, 2018 (CN) .......................... 20180233253.1

(51) Int. Cl.
*C09K 8/588* (2006.01)
*C08F 220/56* (2006.01)
*C08F 220/24* (2006.01)
*E21B 43/16* (2006.01)
*C08F 220/58* (2006.01)

(52) U.S. Cl.
CPC ............ *C09K 8/588* (2013.01); *C08F 220/56* (2013.01); *C08F 220/58* (2013.01); *C08F 2500/21* (2013.01); *C08F 2500/24* (2013.01); *E21B 43/16* (2013.01)

(58) Field of Classification Search
None
See application file for complete search history.

(56) References Cited

U.S. PATENT DOCUMENTS

| 3,709,297 A | * | 1/1973 | Christopher, Jr. ..... | C09K 8/584 166/270.1 |
|---|---|---|---|---|
| 2007/0173413 A1 | * | 7/2007 | Lukocs .................... | C09K 8/64 507/238 |
| 2011/0237468 A1 | * | 9/2011 | Reichenbach-Klinke .................. | C09K 8/5083 507/226 |
| 2017/0327734 A1 | * | 11/2017 | Zhou ........................ | C09K 8/24 |

FOREIGN PATENT DOCUMENTS

| CN | 101619118 A | 1/2010 |
|---|---|---|
| CN | 101619119 A | 1/2010 |
| CN | 102304200 A | 1/2012 |
| CN | 102358782 A | 2/2012 |
| CN | 102504793 A | 6/2012 |
| CN | 102603966 A | 7/2012 |
| CN | 103013478 A | 4/2013 |
| CN | 103073679 A | 5/2013 |
| CN | 103321621 A | 9/2013 |
| CN | 103613706 A | 3/2014 |
| CN | 103992433 A | 8/2014 |
| CN | 104612639 A | 5/2015 |
| CN | 105111369 A | 12/2015 |
| CN | 105294930 A | 2/2016 |
| CN | 105368420 A | 3/2016 |
| CN | 106256870 A | 12/2016 |
| CN | 106988715 A | 7/2017 |

(Continued)

OTHER PUBLICATIONS

Urbanski et al., "Handbook of Analysis Synthetic Polymera and Plastics," pp. 434-435.
Chinese Second Office Action for Application No. 201810233253.1, dated Jan. 3 2020 and English translation thereof, 18 pages.
Chinese Second Office Action for Application No. 201810233253.1, dated Jan. 3, 2020 and English translation thereof, 4 pages.
Li et al., "Synthesis of high impact polystyrene via in-situ bulk polymerization," State Key Laboratory of Fine Chemicals, Department of Polymer Science and Engineering, School of Chemical Engineering, University of Technology, China Academic Journal Electronic Publishing House, http://www.enki.net, 1994-2012, 5 pages.

(Continued)

*Primary Examiner* — Jeffrey D Washville
(74) *Attorney, Agent, or Firm* — Hoffman Warnick LLC

(57) ABSTRACT

The present invention provides a method for in-depth profile control and displacement of low-permeability oil reservoirs, comprising: sequentially injecting a flexible and elastic particle-containing pre-slug, a polymer microsphere-containing main slug and a flexible and elastic particle-containing protective slug into an oil layer, and the three slugs have a volume ratio of total injection amount of 1-2:6-8:1-2. The invention provides a method for in-depth profile control and displacement by using styrene-based flexible and elastic particles in combination with the polyacrylamide polymer microsphere, wherein the flexible elastic particles can block cracks and large pore channels of the oil layer, and the polymer microsphere can displace the remaining oil in the oil layer. In the present invention, different slugs of profile control and displacement system are combined to achieve the objective of blocking cracks and large pore channels, displacing crude oil, and improving oil well recovery.

11 Claims, No Drawings

(56) References Cited

FOREIGN PATENT DOCUMENTS

CN 107795296 A 3/2018
WO 2016099553 A1 6/2016

OTHER PUBLICATIONS

Liu et al., "Research of profile control agent for low permeabilityreservoir and plugging performance," Petrochemical Engineering and Technology Research Institute, vol. 37 No. 1, Jan. 2018, 7 pages.
Zheng et al., "Polymer nanospheres control and floodingin low permeability oil fields and effect," Oil Production Plant 3 of PetroChina Changqing Oilfield Company, vol. 31 No. 12, Dec. 2012, 7 pages.
Shuang et al., "The Application and Prospect of Profile Control and Plugging Agent with High Temperature Resistant in Steam Thermal Recovery," Sino-Global Energy, 2012, vol. 17, No. 1, pp. 47-50.
Zhou, "New information manual on synthetic resins," Beijing,China, Materials Publishing House, pp. 290-294.
Chinese First Office Action, dated Jun. 21, 2019, for Chinese patent application No. 201810233253.1, 17 pages.
Chinese Search Report, dated Jun. 21, 2019, for Chinese patent application No. 201810233253.1, 5 pages.

* cited by examiner

METHOD FOR IN-DEPTH PROFILE CONTROL AND DISPLACEMENT OF LOW-PERMEABILITY OIL RESERVOIRS

CROSS-REFERENCE TO RELATED APPLICATIONS

This application is a continuation of International Application No. PCT/CN2018/082670, filed on Apr. 11, 2018, which claims priority to Chinese Patent Application No. 201710640026.6, filed on Jul. 31, 2017 and Chinese Patent Application No. 201810233253.1, filed on Mar. 21, 2018, all of which are hereby incorporated by reference in their entireties.

FIELD OF TECHNOLOGY

The invention relates to a method for in-depth profile control and displacement of low-permeability oil reservoirs, which pertains to the technical field of petroleum exploitation.

BACKGROUND ART

The proven reserves of low-permeability oil reservoirs, which account for 70% of the total proved reserves in China, have become dominating in crude oil exploitation. Low-permeability oil reservoirs are characterized by large reserves, low abundance, dense reservoirs and high developing technology requirements. In the process of water injection development in low-permeability oil reservoirs, due to the heterogeneity of reservoirs and the existence of cracks, the injected water is unevenly propelled to form a preferential water flow channel, or jets along the cracks, causing continuous increase of the water content in the oil well. Chemical profile control and displacement technology has become the primary means to control the increase of water content in oil wells.

Chinese patent publication CN 103216211A discloses a method in which a jelly profile control agent suspends and carries water-absorbing resin particles and water-insoluble solid particles into a crack; CN 104140801A discloses an aluminum gel profile control agent; and CN 104650842A discloses a profile control and displacement composition and a method for profile control and displacement. What is disclosed in all of these prior arts are metal-crosslinked or phenolic-crosslinked weak gels, and all of the disclosed methods pertain to a method in which the profile control is carried out with a weak gel as the main agent. However, there are two main drawbacks to such methods. Firstly, the weak gel system is formulated by injecting multiple components such as polyacrylamide and crosslinker underground for gelation, and the gelation performance is difficult to control due to the influence of the oil reservoir environment. Secondly, molecular chain curling and gel dehydration occurs in the gel system since the linear cross-linking of polyacrylamide is affected by the mineralization degree of the oil reservoir, which leads to a shorter effective period, and thus the purpose of improving in-depth water flooding in the oil reservoir to enhance oil recovery cannot be achieved.

Therefore, providing a new method for in-depth profile control and displacement of low-permeability oil reservoirs has become a technical problem that needs to be solved in the field.

SUMMARY OF THE INVENTION

In view of the above disadvantages and deficiencies, it is an object of the present invention to provide a polymer microsphere.

It is also an object of the present invention to provide a polymer microsphere-containing main slug.

It is also an object of the present invention to provide a method for in-depth profile control and displacement of low-permeability oil reservoirs.

In order to achieve the above objects, the present invention provides a polymer microsphere synthesized by reacting 18%-25% of comonomers, 0.2%-0.3% of a crosslinker, 0.1%-0.2% of an initiator, 7.5%-8.5% of a dispersant, 40%-45% of an external phase, and balance of water as an internal phase by inverse emulsion polymerization, based on 100% of the total weight of raw materials used.

In a specific embodiment, preferably, the comonomers comprise one or more selected from 2-acrylamide-2-methylpropanesulfonic acid, acrylamide, acrylic acid, acryloyloxyethyl trimethylammonium chloride, n-butyl acrylate and dipentaerythritol hexaacrylate.

In a specific embodiment, preferably, the crosslinker comprises N,N-methylenebisacrylamide and/or divinylbenzene.

In a specific embodiment, preferably, the initiator comprises one or more selected from ammonium persulfate, sodium persulfate, potassium persulfate, benzoyl peroxide and hydrogen peroxide.

In a specific embodiment, preferably, the dispersant comprises one or more selected from Span 60, Span 80, Tween 60 and Tween 80.

In a specific embodiment, preferably, the external phase includes one or more selected from white oil, vegetable oil, diesel oil and kerosene.

In a specific embodiment, preferably, the polymer microsphere has an initial particle size of 0.1-20 μm and a hydration swelling rate of 5-15 folds.

In a specific embodiment, preferably, the inverse emulsion polymerization is carried out at 90-105° C. for 5-20 mins.

The present invention further provides a polymer microsphere-containing main slug, comprising 0.25%-5% of the polymer microsphere and 95%-99.75% of water, based on 100% of the total weight of the polymer microsphere-containing main slug.

The present invention further provides a method for in-depth profile control and displacement of low-permeability oil reservoirs, comprising: sequentially injecting a flexible and elastic particle-containing pre-slug, said polymer microsphere-containing main slug and a flexible and elastic particle-containing protective slug into an oil layer, and the flexible and elastic particle-containing pre-slug, the polymer microsphere-containing main slug and the flexible and elastic particle-containing protective slug have a volume ratio of total injection amount of 1-2:6-8:1-2.

In a specific embodiment, preferably, the daily injection amount of the flexible and elastic particle-containing pre-slug and the daily injection amount of the flexible and elastic particle-containing protective slug are 1.5-2.5 times by volume of the daily water injection amount of the target well for profile control and displacement, respectively.

In a specific embodiment, preferably, the daily injection amount of the polymer microsphere-containing main slug is 1.0-1.5 times by volume of the daily water injection amount of the target well for profile control and displacement.

In a specific embodiment, preferably, the cumulative total injection amount of the flexible and elastic particle-containing pre-slug, the polymer microsphere-containing main slug and the flexible and elastic particle-containing protective slug is 0.1-0.3 times by volume of the controlled pore volume in the oil layer of the target well for profile control and displacement.

In a specific embodiment, preferably, the flexible and elastic particle-containing pre-slug, the polymer microsphere-containing main slug and the flexible and elastic particle-containing protective slug have a volume ratio of total injection amount of 1:8:1.

In a specific embodiment, preferably, the flexible and elastic particle-containing pre-slug comprises 0.2%-0.3% of flexible and elastic particles, 0.05%-0.1% of polyacrylamide and balance of water, based on 100% of the total weight of the flexible and elastic particle-containing pre-slug.

In a specific embodiment, preferably, in the flexible and elastic particle-containing pre-slug, the flexible and elastic particles are produced by polymerizing 49.85%-49.95% of styrene and 49.85%-49.95% of butadiene as main agents with 0.1%-0.3% of benzoyl peroxide as an initiator, based on 100% of the total weight of raw materials used, to obtain a colloid, and then pelleting the colloid.

In a specific embodiment, preferably, in the flexible and elastic particle-containing pre-slug, the flexible and elastic particles have a particle size of 3-6 mm and an elongation at break of 1000%-1300%.

In a specific embodiment, preferably, the polymerization is carried out at 80-85° C. for 70-100 mins.

In a specific embodiment, preferably, in the flexible and elastic particle-containing pre-slug, the polyacrylamide has a molecular weight of 10-16 million and a hydrolysis degree of 20%-30%.

In a specific embodiment, preferably, the flexible and elastic particle-containing protective slug comprises 0.3%-0.4% of flexible and elastic particles, 0.1%-0.15% of polyacrylamide and balance of water, based on 100% of the total weight of the flexible and elastic particle-containing protective slug.

In a specific embodiment, preferably, in the flexible and elastic particle-containing protective slug, the flexible and elastic particles are produced by polymerizing 49.85%-49.95% of styrene and 49.85%-49.95% of butadiene as main agents with 0.1%-0.3% of benzoyl peroxide as an initiator, based on 100% of the total weight of raw materials used, to obtain a colloid, and then pelleting the colloid.

In a specific embodiment, preferably, in the flexible and elastic particle-containing protective slug, the flexible elastic particles have a particle size of 3-6 mm and an elongation at break of 1000%-1300%.

In a specific embodiment, preferably, the polymerization is carried out at 80-85° C. for 70-100 mins.

In a specific embodiment, preferably, in the flexible and elastic particle-containing protective slug, the polyacrylamide has a molecular weight of 10-16 million and a hydrolysis degree of 20%-30%.

The pre-slug and the protective slug used in the present invention contain styrene-based flexible and elastic particles, which can block the cracks and large pore channels in the oil layer for a long term and expand the swept volume of the polymer microsphere and the subsequent injected water. The main slug used contains a polymer microsphere, which can fully exploit advantages of the polymer microsphere entering the deep oil layer to displace the remaining oil. A polyacrylamide solution can be used to suspend and carry the flexible and elastic particles to enhance the injectability of the flexible and elastic particles.

An object of the present invention is to overcome the above problems of the current underground gelling system, and to provide a method for in-depth profile control and displacement of low-permeability oil reservoirs, which method is capable of realizing large dose injection, improving uneven water flooding in the deep oil reservoir, and ultimately improving oil recovery.

It is provided in the present invention a method for in-depth profile control and displacement of low-permeability oil reservoirs, comprising: sequentially injecting a flexible and elastic particle-containing pre-slug, the polymer microsphere-containing main slug and a flexible and elastic particle-containing protective slug into an oil layer, wherein the three slugs have a volume ratio of total injection amount of 1:8:1;

the flexible and elastic particle-containing pre-slug comprises, by mass ratio, 0.2%-0.3% of the flexible and elastic particles, 0.05%-0.1% of polyacrylamide and balance of water;

the polymer microsphere-containing main slug comprises, by mass ratio, 0.25%-5% of the polymer microsphere and 95%-99.75% of water;

the flexible and elastic particle-containing protective slug comprise, by mass ratio, 0.3%-0.4% of the flexible and elastic particles, 0.1%-0.15% of polyacrylamide and balance of water.

The daily injection amounts of the flexible and elastic particle-containing pre-slug and the flexible and elastic particle-containing protective slug are 1.5-2.5 times by volume of the daily water injection amount of the target well for profile control and displacement, respectively.

The daily injection amount of the polymer microsphere-containing main slug is 1.0 times by volume of the daily water injection amount of the target well for profile control and displacement.

The cumulative total injection amount of the flexible and elastic particle-containing pre-slug, the polymer microsphere-containing main slug and the flexible and elastic particle-containing protective slug is 0.1-0.3 times by volume of the controlled pore volume in the oil layer of the target well for profile control and displacement.

The flexible and elastic particles are produced by polymerizing, by mass percentage, 49.85%-49.95% of styrene and 49.85%-49.95% of butadiene as the main agent with 0.1%-0.3% of benzoyl peroxide as an initiator to obtain a colloid, and then pelleting the colloid.

The flexible and elastic particles have a particle size of 3-6 mm and an elongation at break of 1000%-1300%.

The polymer microspheres are synthesized by reacting, by mass percentage, 6%-9% of 2-acrylamide-2-methylpropane-sulfonic acid and 12%-16% of acrylamide as comonomers, 0.2%-0.3% of N,N-methylenebisacrylamide as a crosslinker, 0.1%-0.2% of ammonium persulfate as an initiator, 5%-5.5% of Span 60 and 2.5%-3.0% of Tween 60 as a dispersant, 40%-45% of white oil as an external phase and balance of water as an internal phase, by inverse emulsion polymerization.

The polymer microspheres have an initial particle size of 0.1-20 μm and a hydration swelling rate of 5-15 folds.

The polyacrylamide has a molecular weight of 15 million and a hydrolysis degree of 20%-30%.

BENEFICIAL EFFECTS OF THE INVENTION

The method for in-depth profile control and displacement of low-permeability oil reservoirs according to the present invention may achieve the objective of in-depth blocking and displacement by sequentially injecting a flexible and elastic particle-containing pre-slug, a polymer microsphere-containing main slug and a flexible and elastic particle-containing protective slug into an oil layer, wherein the flexible and elastic particles are carried by a polyacrylamide solution, and can block cracks and large pore channels in the oil layer and enlarge swept volume; the polymer microsphere can displace the remaining oil in the oil layer; the use of the polymer microsphere as the main slug can fully exploit advantages of the polymer microsphere entering the deep oil layer to displace the remaining oil, which improves the uneven water flooding in the deep oil layer and displace the remaining oil, and achieves the objective of improving oil recovery.

DETAILED DESCRIPTION OF PREFERRED EMBODIMENTS

In order to clearly understand the technical features, objects, and advantages of the present invention, the technical solutions of the present invention are described in detail below with reference to the following specific examples, which, however, are not to be construed as limiting the scope of the invention.

Example 1

This example provides a polymer microsphere synthesized by reacting 9% of 2-acrylamide-2-methylpropane-sulfonic acid and 16% of acrylamide as comonomers, 0.3% of N,N-methylenebisacrylamide as a crosslinker, 0.2% of ammonium persulfate as an initiator, 5.5% of Span 60 and 3.0% of Tween 60 as a dispersant, 45% of white oil as an external phase and balance of water as an internal phase by inverse emulsion polymerization, based on 100% of the total weight of raw materials used, wherein the polymerization temperature is 90° C. and the polymerization time is 20 mins. The polymer microsphere produced in this example has an initial particle size of 20 μm and a hydration swelling rate of 15 folds.

Example 2

This example provides a polymer microsphere-containing main slug comprising 3% of the polymer microsphere produced in Example 1 and 97% of water, based on 100% of the total weight of the polymer microsphere-containing main slug.

Example 3

This example provides a method for in-depth profile control and displacement of low-permeability oil reservoirs, comprising the following steps:

the total injection amount is designed to be 0.1 PV, i.e. 5000 m$^3$, in a case that the daily water injection amount of the target well for profile control and displacement is 20 m$^3$, and the controlled pore volume is 50000 m; a flexible and elastic particle-containing pre-slug, the polymer microsphere-containing main slug produced in Example 2 and a flexible and elastic particle-containing protective slug are sequentially injected into the oil layer through the water injection well with daily injection amounts of each slug of 30 m$^3$, 20 m$^3$ and 50 m$^3$ respectively, and total injection amounts of each slug of 500 m$^3$, 4000 m$^3$ and 500 m$^3$ respectively;

wherein the flexible and elastic particle-containing pre-slug comprises the following components: 0.25% of flexible and elastic particles, 0.75% of polyacrylamide (having a molecular weight of 10 million, a hydrolysis degree of 20%) and balance of water, by mass ratio;

the flexible and elastic particle-containing protective slug comprises the following components: 0.35% of flexible and elastic particles, 0.12% of polyacrylamide (having a molecular weight of 10 million, a hydrolysis degree of 20%) and balance of water, by mass ratio.

The flexible and elastic particles are produced as follows: 49.95% of styrene and 49.95% of butadiene as main agents and 0.1% of benzoyl peroxide as an initiator, by mass ratio, are polymerized to obtain a colloid, wherein the the polymerization temperature is 85° C. and the polymerization time is 70 mins. The colloid is then pelleted. The flexible and elastic particles have a particle size of 6 mm and an elongation at break of 1300%.

After profile control and displacement treatment, the corresponding oil well has an oil increase rate of 8%, and a water reduction rate of 12%.

Example 4

This example provides a polymer microsphere synthesized by reacting 9% of 2-acrylamide-2-methylpropane-sulfonic acid and 16% of acrylamide as comonomers, 0.3% of N,N-methylenebisacrylamide as a crosslinker, 0.2% of ammonium persulfate as an initiator, 5.5% of Span 60 and 3.0% of Tween 60 as a dispersant, 45% of white oil as an external phase and balance of water as an internal phase by inverse emulsion polymerization, based on 100% of the total weight of raw materials used, wherein the polymerization temperature is 95° C. and the polymerization time is 15 mins.

The polymer microsphere produced in this example has an initial particle size of 20 μm and a hydration swelling rate of 15 folds.

Example 5

This example provides a polymer microsphere-containing main slug comprising 5% of the polymer microsphere produced in Example 4 and 95% of water, based on 100% of the total weight of the polymer microsphere-containing main slug.

Example 6

This example provides a method for in-depth profile control and displacement of low-permeability oil reservoirs, comprising the following steps:

the total injection amount is designed to be 0.2 PV, i.e. 12000 m$^3$, in a case that the daily water injection amount of the target well for profile control and displacement is 40 m$^3$, and the controlled pore volume is 60000 m$^3$; a flexible and elastic particle-containing pre-slug, the polymer microsphere-containing main slug produced in Example 5 and a flexible and elastic particle-containing protective slug are sequentially injected into the oil layer through the water injection well with daily injection amounts of each slug of 60 m$^3$, 40 m$^3$ and 60 m$^3$ respectively, and total injection amounts of each slug of 1200 m$^3$, 9600 m$^3$ and 1200 m$^3$ respectively;

wherein the flexible and elastic particle-containing pre-slug comprises the following components: 0.3% of flexible and elastic particles, 0.1% of polyacrylamide (having a molecular weight of 12 million, a hydrolysis degree of 23%) and balance of water, by mass ratio;

the flexible and elastic particle-containing protective slug comprises the following components: 0.4% of flexible and elastic particles, 0.15% of polyacrylamide (having a molecular weight of 12 million, a hydrolysis degree of 23%) and balance of water, by mass ratio.

The flexible and elastic particles are produced as follows: 49.95% of styrene and 49.95% of butadiene as main agents and 0.1% of benzoyl peroxide as an initiator, by mass ratio, are polymerized to obtain a colloid, wherein the the polymerization temperature is 83° C. and the polymerization time is 80 mins. The colloid is then pelleted. The flexible and elastic particles have a particle size of 6 mm and an elongation at break of 1300%.

The flexible and elastic particles are used to block cracks and large pore channels in the oil layer and expand the swept volume, and the polymer microsphere is used to displace the remaining oil in the oil layer. After profile control and displacement treatment, the corresponding oil well has an oil increase rate of 9.5%, and a water reduction rate of 12.5%.

Example 7

This example provides a polymer microsphere synthesized by reacting 7.5% of 2-acrylamide-2-methylpropane-sulfonic acid and 14% of acrylamide as comonomers, 0.25% of N,N-methylenebisacrylamide as a crosslinker, 0.15% of ammonium persulfate as an initiator, 5.25% of Span 60 and 2.75% of Tween 60 as a dispersant, 42.5% of white oil as an external phase and balance of water as an internal phase by inverse emulsion polymerization, based on 100% of the total weight of raw materials used, wherein the polymerization temperature is 100° C. and the polymerization time is 10 mins.

The polymer microsphere produced in this example has an initial particle size of 20 μm and a hydration swelling rate of 15 folds.

Example 8

This example provides a polymer microsphere-containing main slug comprising 5% of the polymer microsphere produced in Example 7 and 95% of water, based on 100% of the total weight of the polymer microsphere-containing main slug.

Example 9

This example provides a method for in-depth profile control and displacement of low-permeability oil reservoirs, comprising the following steps:

the total injection amount is designed to be 0.2 PV, i.e. 12000 m$^3$, in a case that the daily water injection amount of the target well for profile control and displacement is 40 m$^3$, and the controlled pore volume is 60000 m$^3$; a flexible and elastic particle-containing pre-slug, the polymer microsphere-containing main slug produced in Example 8 and a flexible and elastic particle-containing protective slug are sequentially injected into the oil layer through the water injection well with daily injection amounts of each slug of 60 m$^3$, 40 m$^3$ and 60 m$^3$ respectively, and total injection amounts of each slug of 1200 m$^3$, 9000 m$^3$ and 1800 m$^3$ respectively;

wherein the flexible and elastic particle-containing pre-slug comprises the following components: 0.3% of flexible and elastic particles, 0.1% of polyacrylamide (having a molecular weight of 13 million, a hydrolysis degree of 24%) and balance of water, by mass ratio;

the flexible and elastic particle-containing protective slug comprises the following components: 0.4% of flexible and elastic particles, 0.15% of polyacrylamide (having a molecular weight of 14 million, a hydrolysis degree of 26%) and balance of water, by mass ratio.

The flexible and elastic particles are produced as follows: 49.9% of styrene and 49.9% of butadiene as main agents and 0.2% of benzoyl peroxide as an initiator, by mass ratio, are polymerized to obtain a colloid, wherein the the polymerization temperature is 82° C. and the polymerization time is 90 mins. The colloid is then pelleted. The flexible and elastic particles have a particle size of 5 mm and an elongation at break of 1200%.

The flexible and elastic particles are used to block cracks and large pore channels in the oil layer and expand the swept volume, and the polymer microsphere is used to displace the remaining oil in the oil layer. After profile control and displacement treatment, the corresponding oil well has an oil increase rate of 9.5%, and a water reduction rate of 12.5%.

Example 10

This example provides a polymer microsphere synthesized by reacting 6% of 2-acrylamide-2-methylpropane-sulfonic acid and 12% of acrylamide as comonomers, 0.2% of N,N-methylenebisacrylamide as a crosslinker, 0.1% of ammonium persulfate as an initiator, 5.0% of Span 60 and 2.5% of Tween 60 as a dispersant, 40% of white oil as an external phase and balance of water as an internal phase by inverse emulsion polymerization, based on 100% of the total weight of raw materials used, wherein the polymerization temperature is 105° C. and the polymerization time is 5 mins.

The polymer microsphere produced in this example has an initial particle size of 20 μm and a hydration swelling rate of 15 folds.

Example 11

This example provides a polymer microsphere-containing main slug comprising 5% of the polymer microsphere produced in Example 10 and 95% of water, based on 100% of the total weight of the polymer microsphere-containing main slug.

Example 12

This example provides a method for in-depth profile control and displacement of low-permeability oil reservoirs, comprising the following steps:

the total injection amount is designed to be 0.2 PV, i.e. 12000 m$^3$, in a case that the daily water injection amount of the target well for profile control and displacement is 40 m$^3$, the controlled pore volume is 60000 m$^3$; a flexible and elastic particle-containing pre-slug, the polymer microsphere-containing main slug produced in Example 11 and a flexible and elastic particle-containing protective slug are sequentially injected into the oil layer through the water injection well with daily injection amounts of each slug of 60 m$^3$, 40 m$^3$ and 60 m$^3$ respectively, and total injection amounts of each slug of 2400 m$^3$, 8400 m$^3$ and 1200 m$^3$ respectively;

wherein the flexible and elastic particle-containing pre-slug comprises the following components: 0.3% of flexible and elastic particles, 0.1% of polyacrylamide (having a molecular weight of 16 million, a hydrolysis degree of 30%) and balance of water, by mass ratio;

the flexible and elastic particle-containing protective slug comprises the following components: 0.4% of flexible and elastic particles, 0.15% of polyacrylamide (having a molecular weight of 16 million, a hydrolysis degree of 30%) and balance of water, by mass ratio.

The flexible and elastic particles are produced as follows: 49.85% of styrene and 49.85% of butadiene as main agents and 0.3% of benzoyl peroxide as an initiator, by mass ratio, are polymerized to obtain a colloid, wherein the the polymerization temperature is 80° C. and the polymerization time is 100 mins. The colloid is then pelleted. The flexible and elastic particles have a particle size of 6 mm and an elongation at break of 1300%.

The flexible and elastic particles are used to block cracks and large pore channels in the oil layer and expand the swept volume, and the polymer microsphere is used to displace the remaining oil in the oil layer. After profile control and displacement treatment, the corresponding oil well has an oil increase rate of 10%, and a water reduction rate of 13%.

Seen from above, the method for in-depth profile control and displacement of low-permeability oil reservoirs according to the present invention is a method having large injection amounts, in which different slug of profile control and displacement system are combined to block cracks and large pore channels and to displace the crude oil, thereby achieving the objective of improving oil well recovery.

The above examples are merely illustrative of the present invention and are not intended to limit the scope of the invention, and all designs that are the same as or similar with the present invention are within the scope of the present invention.

The invention claimed is:

1. A method for in-depth profile control and displacement of low-permeability oil reservoirs, wherein the method comprises:
   sequentially injecting:
   (a) a flexible and elastic particle-containing pre-slug,
   (b) a polymer microsphere-containing main slug comprising 0.25%-5% of a polymer microsphere and 95%-99.75% of water, based on 100% of the total weight of the polymer microsphere-containing main slug, and
   (c) a flexible and elastic particle-containing protective slug into an oil layer,
   wherein each of the flexible and elastic particle-containing pre-slug, the polymer microsphere-containing main slug and the flexible and elastic particle-containing protective slug has a respective total injection amount, and a volume ratio between the respective total injection amount of each slug is 1-2:6-8:1-2;
   wherein the polymer microsphere of the polymer microsphere-containing main slug is synthesized by reacting 18%-25% of co-monomers, 0.2%-0.3% of a crosslinker, 0.1%-0.2% of an initiator, 7.5%-8.5% of a dispersant, 40%-45% of an external phase, and balance of water as an internal phase by inverse emulsion polymerization, based on 100% of the total weight of raw materials used, and
   wherein the co-monomer is one or more of 2-acrylamide-2-methylpropanesulfonic acid and acrylamide; the crosslinker is N,N-methylenebisacrylamide; the initiator is ammonium persulfate; the dispersant is one or more of Span 60 and Tween 60; and the external phase is a white oil.

2. The method for in-depth profile control and displacement of low-permeability oil reservoirs according to claim 1, wherein each of a daily injection amount of the flexible and elastic particle-containing pre-slug and a daily injection amount of the flexible and elastic particle-containing protective slug is 1.5-2.5 times by volume of a daily water injection amount of a target well for profile control and displacement, respectively.

3. The method for in-depth profile control and displacement of low-permeability oil reservoirs according to claim 1, wherein a daily injection amount of the polymer microsphere-containing main slug is 1.0-1.5 times by volume of a daily water injection amount of a target well for profile control and displacement.

4. The method for in-depth profile control and displacement of low-permeability oil reservoirs according to claim 1, wherein the cumulative total injection amount of the flexible and elastic particle-containing pre-slug, the polymer microsphere-containing main slug and the flexible and elastic particle-containing protective slug is 0.1-0.3 times by volume of the controlled pore volume in the oil layer of the target well for profile control and displacement.

5. The method for in-depth profile control and displacement of low-permeability oil reservoirs according to claim 1, wherein the flexible and elastic particle-containing pre-slug, the polymer microsphere-containing main slug and the flexible and elastic particle-containing protective slug have a volume ratio of total injection amount of 1:8:1.

6. The method for in-depth profile control and displacement of low-permeability oil reservoirs according to claim 1, wherein the flexible and elastic particle-containing pre-slug comprises 0.2%-0.3% of the flexible and elastic particles, 0.05%-0.1% of polyacrylamide and balance of water, based on 100% of the total weight of the flexible and elastic particle-containing pre-slug.

7. The method for in-depth profile control and displacement of low-permeability oil reservoirs according to claim 6, wherein the flexible and elastic particles are produced by polymerizing 49.85%-49.95% of styrene and 49.85%-49.95% of butadiene as main agents, with 0.1%-0.3% of benzoyl peroxide as an initiator, based on 100% of the total weight of raw materials used, to obtain a colloid, and then pelleting the colloid,
   wherein the polymerization is carried out at 80-85° C. for 70-100 mins.

8. The method for in-depth profile control and displacement of low-permeability oil reservoirs according to claim 7, wherein the flexible and elastic particles in the flexible and elastic particle-containing pre-slug have a particle size of 3-6 mm and an elongation at break of 1000%-1300%.

9. The method for in-depth profile control and displacement of low-permeability oil reservoirs according to claim 1, wherein the flexible and elastic particle-containing protective slug comprises 0.3%-0.4% of the flexible and elastic particles, 0.1%-0.15% of polyacrylamide and balance of water, based on 100% of the total weight of the flexible and elastic particle-containing protective slug.

10. The method for in-depth profile control and displacement of low-permeability oil reservoirs according to claim 9, wherein the flexible and elastic particles are produced by polymerizing 49.85%-49.95% of styrene and 49.85%-49.95% of butadiene as main agents, with 0.1%-0.3% of benzoyl peroxide as an initiator, based on 100% of the total weight of raw materials used, to obtain a colloid, and then pelleting the colloid,
   wherein the polymerization is carried out at 80-85° C. for 70-100 mins.

11. The method for in-depth profile control and displacement of low-permeability oil reservoirs according to claim 10, wherein the flexible and elastic particles in the flexible and elastic particle-containing protective slug have a particle size of 3-6 mm and an elongation at break of 1000%-1300%.

* * * * *